United States Patent [19]

Figuereo

[11] Patent Number: 5,173,234
[45] Date of Patent: Dec. 22, 1992

[54] PROCESS AND AUTOMATIC MACHINE FOR MANUFACTURE OF CALIBRATED RINGS FROM AN EXTRUDATE

[75] Inventor: Blaise F. Figuereo, Triel-Sur-Seine, France

[73] Assignee: Eropol Finance et Developpement, Vernouillet, France

[21] Appl. No.: 738,823

[22] Filed: Aug. 1, 1991

[30] Foreign Application Priority Data

Aug. 3, 1990 [FR] France ................................ 90 09942

[51] Int. Cl.$^5$ ...................... B29C 69/00; B29L 31/26
[52] U.S. Cl. .................. 264/148; 156/244.18; 156/258; 156/267; 156/304.2; 156/304.5; 156/512; 264/152; 264/159; 264/161; 264/163; 264/210.1; 264/248; 264/295; 264/297.5; 264/297.6; 264/326; 264/334; 264/DIG. 59; 264/DIG. 67; 425/502; 425/508; 425/510; 425/296; 425/313; 425/298; 425/327; 425/340; 425/392; 425/395; 425/397; 425/439; 425/442; 425/451; 425/451.9; 425/453; 425/806; 425/DIG. 42
[58] Field of Search ................ 264/148, 150, 152, 159, 264/161, 163, 210.1, 248, 249, 295, 326, 297.5, 297.6, 334, DIG. 59, DIG. 67; 156/244.18, 258, 267, 304.5, 304.2, 512; 425/502, 508, 510, 289, 298, 327, 340, 351, 348.5, 392, 395, 397, 439, 442, 451, 451.9, 453, 806, DIG. 42, 296, 308, 313

[56] References Cited

U.S. PATENT DOCUMENTS

| | | | |
|---|---|---|---|
| 2,354,241 | 7/1944 | Anderson | 425/DIG. 42 |
| 2,913,767 | 11/1959 | Simon | 425/DIG. 42 |
| 3,026,569 | 3/1962 | Keller | 264/148 |
| 3,737,502 | 6/1973 | Rees | 264/161 |
| 3,801,406 | 4/1974 | Debenedetti | 264/148 |
| 4,178,003 | 12/1979 | Hobson | 425/DIG. 42 |
| 4,551,293 | 11/1985 | Diehl, Jr. et al. | 264/150 |
| 5,073,329 | 12/1991 | Carrara | 264/297.5 |

Primary Examiner—Jeffery Thurlow
Assistant Examiner—Mathieu Vargot
Attorney, Agent, or Firm—Rodgers & Rodgers

[57] ABSTRACT

According to the invention, calibrated rings are obtained by superficially vulcanizing extruded or profiled extrudate at the exit of an extrusion head (T), then by cutting this vulcanized extrudate into portions by means of a conical cutting device (C), subsequently by butting the two ends, in the respective form of a conical tip and a funnel, of each portion (t) together under hot conditions and under a controlled pressure, in order to obtain a ring blank which is then engaged between the half-cavities of a mold (Mo), where it undergoes shaping and vulcanization by the heating of the latter and thereafter deburring as a result of a shearing action produced by a push device (D) causing the half-cavities to slide in the closed position in the frame of the mold, before causing the opening of the latter by means of a device (G) and the release of the calibrated and superficially clean ring obtained.

10 Claims, 2 Drawing Sheets

PROCESS AND AUTOMATIC MACHINE FOR MANUFACTURE OF CALIBRATED RINGS FROM AN EXTRUDATE

The present invention relates to a process and to an automatic machine for manufacture of calibrated rings from an extruded or profiled extrudate and, more particularly, it relates to such a process and machine designed for the production of calibrated annular gaskets, especially standardized or special O-ring gaskets, and gaskets and annular rings of a shape circular or according to another geometry and of any extruded cross-section or profiled cross-section of special configuration and, in fact, depending on their intended use, any cross-section which can be given to an extrudate obtained by using an extrusion head designed by the inventor and forming the subject of the French Patent No. 2,598,652 entitled: "Machine for the simultaneous extrusion of a plurality of materials", note being taken that, as a result of the use of this machine, the above-mentioned annular gaskets, O-ring gaskets and annular rings can be formed, as required, by the use of a single material or of a plurality of different materials and can incorporate a fibrous or other reinforcement and/or be equipped with a core forming a central nucleus made of any material chosen according to the action for which this core is intended.

BACKGROUND OF THE INVENTION

In the art known at the present time for the production of annular gaskets or rings of round or other cross-section, various molding and vulcanization processes are employed, for example compression or injection molding processes, by which there are obtained at the exit of the molding and vulcanizing device gaskets and rings having burrs corresponding to the location of closing of the inner cavities of the molds, and a deburring operation which is highly complex and lengthy to carry out and therefore involves a high outlay is necessary to obtain the desired perfect surfacing and calibration of these annular gaskets and rings.

This deburring operation is acknowledged to be a major disadvantage of these known processes for the manufacture of gaskets, particularly where O-ring gaskets are concerned. Moreover, for example in injection molding, it is virtually impossible to obtain a perfect homogeneity of the material used, and furthermore it is not possible to produce gaskets incorporating a plurality of materials, particularly fibrous materials, uniformly distributed in the entire mass of these gaskets.

SUMMARY OF THE INVENTION

Consequently, one of the main objects of the present invention is to eliminate most of the disadvantages of these known processes for the manufacture of annular gaskets or the like, by the use, according to the present invention, of a hitherto unknown process which is carried out directly at the exit of an extrusion head delivering a continuous extruded or profiled extrudate with the cross-section desired for the annular gaskets or rings to be manufactured, this extrusion process ensuring that the material or materials used will be perfectly homogeneous and, if desired, filled with fibers, in the entire mass of the extrudate and therefore in the entire mass of the gaskets or rings.

Another object of the present invention is to eliminate the known operation of deburring after demolding, this operation now being carried out directly in the mold in accordance with this novel process.

In general terms, the process according to the present invention is notable in that it involves, to make it graspable, superficially vulcanizing the extrudate extruded or profiled to the configuration of the cross-section of the annular gasket or ring to be produced and delivered vertically and continuously at the exit of an extrusion head, then cutting this extrudate, which has become graspable as a result of superficial precuring, continuously into portions of a length corresponding to the mean circumference of the desired gasket or ring by means of a conical cutting device giving each portion, in the vertical position, one end in the form of a conical tip and its opposite end in the form of a funnel of the same conicity, then bringing each portion into a horizontal position and shaping it into an annular blank in a vertical plane and butting its ends together under hot conditions and under a controlled pressure so as to obtain a concentric joining connection of these and thus provide a gasket or ring blank, then tilting this blank into one of the molding half-cavities of a mold in the open position incorporating, in a receptacle of each of its two frame elements, a molding half-cavity spring-mounted movably in its receptacle, then reclosing these two mold frame elements in order to trap the blank, with the springs compressed, between the movable half-cavities and to vulcanize it by heating the mold for a specific time, then, after vulcanization, causing a push device incorporated in one of the mold frame elements to act by controlling the movability of the set of two half-cavities in order to produce a shearing action of the lateral edges of the receptacles of these half-cavities on the burrs of the blank gripped between these edges, and finally to bring about the opening of the two mold frame elements after the mold has been tilted upside down in order to extract by gravity or, if necessary, by action of the push device the gasket or ring produced perfectly calibrated and superficially clean.

As will certainly easily be understood from this definition of the process according to the present invention, the said pressure exerted on the ends of the blank when they are being butted exactly together, that is to say during their joining connection, is perfectly controllable, and it is therefore possible, during the high-pressure extrusion, to produce a blank which will not lose anything of its qualities during this joining connection of its ends if this is carried out at the same high pressure.

Moreover, this process, which can be called "extrusion molding", has a major advantage over prior processes employing only molding, because the material or mixture of materials used for producing the blank is homogeneous and is converted almost immediately into the finished article.

The automatic machine designed for carrying out this process for the manufacture of annular gaskets or rings in particular is notable in that it comprises, installed one after the other and mounted so as to interact from an extrusion head delivering an extrudate vertically, a plurality of devices which consist of a precuring device ensuring a superficial vulcanization of the extrudate passing vertically through it and having at its exit a conical cutting device moving at the same speed as the extrudate and cutting off an extrudate portion which is taken up vertically by a grasping device driven in rotation step by step and bringing this portion into a horizontal position on a device for shaping an annular blank from the extrudate portion and designed to bring about, under hot conditions, a joining connection, concentric and under controlled pressure, of the ends of this portion which then constitutes a gasket or ring blank positioned in a vertical plane, this latter device also being designed to tilt this blank into a molding half-cavity of a vulcanization mold arranged horizontally in the open position and consisting of two frame elements articulated on one another, each incorporating a half-cavity supported elastically and vertically movable, this mold forming part of a series of molds associated with one another in series in the form of an endless conveyor travelling in steps and passing through a gantry for the compression closing and locking of each of the molds containing a blank, this gantry being followed, at a distance specific and adjustable for ensuring the vulcanization of the blanks during the time for the passage of each of the closed molds over this distance in steps, by a push device designed to act on a piston element incorporated in the lower frame element of each mold and connected firmly to the lower half-cavity of the latter, with the result that the pushing action displaces the piston element and the set of half-cavities upward in relation to the edges of the receptacles of these half-cavities which grip the blank burrs between them, thereby causing the shearing of these burrs inside each closed mold before it reaches a device for controlling the opening of the mold elements, arranged so as to act on each mold when it is overturned into an upside-down position over the lower return path of the conveyor, this latter device also being designed to act on said member of the lower mold frame element in order to extract both the gasket or ring produced and the sheared burrs, if this gasket or ring does not fall simply by gravity onto a conveyor belt installed under this device.

More specifically, according to the invention, the conical cutting device consists of one or more cutting blades arranged at a descending inclination convergent toward the vertical axis of the extrudate and coming closer together at the same time as they move downward at the same speed as the extrudate, in order to cut off portions of the latter, each having one end in the form of a conical tip and the other end in the form of a conical cavity of the same conicity. This device being designed so that the blades retract during their quick upward return to their initial starting point after the cutting operation.

Furthermore, the device for grasping each extrudate portion consists of a star, preferably with eight branches, which operates by stepwise rotation as a function of the rate of output of these portions and each branch of which carries at its free end a pair of grasping jaws designed for gripping each superficially vulcanized extrudate portion presented in a vertical position and for relaxing its grip when the stepwise rotation of the star has brought this portion into a horizontal position and the latter is taken up by the grasping jaws of the device for shaping an annular blank.

More specifically, it should be noted that this device for grasping each extrudate portion has its branches distributed two by two in the form of a V, the aperture angle of which is adjustable so that the pairs of jaws carried by its free ends can be moved apart from or nearer to one another as a function of the length of the extrudate portion, and so that the ends of the latter project externally from these jaws sufficiently to be seized subsequently by the jaws of the device for shaping an annular blank from the extrudate portion.

On the other hand, in a way similar to the grasping device, this device for shaping an annular blank from each extrudate portion comprises two oscillating arms which are associated in the form of a V and the aperture angle of which is adjustable according to the length of the extrudate portion and which each carry at their free end a pair of jaws mounted pivotably, these jaws being designed and controlled to seize the ends of the extrudate portion which project externally from the jaws of the arms of the star supporting this portion when these latter jaws open and move aside as a result of the rotation of the star one step, whereas the jaws of the two oscillating arms pivot inward on themselves in order to bring the ends of the extrudate portion opposite one another, while the arms reclose so that this portion assumes the form of a hanging loop and until the portion end in the form of a conical tip engages into and is applied under pressure and under hot conditions in the other funnel-shaped end of the latter, in order to make a perfectly concentric joining connection, the portion then being in the form of a desired annular blank of an annular gasket or ring.

Moreover, this device for shaping an annular blank from each extrudate portion is designed to make that each blank is tilted and put into the horizontal position in the molding half-cavity of the lower frame element of a conveyor mold presented in the open position and located opposite this device.

More specifically and according to an embodiment of the invention, the upper frame element of each of the molds incorporates, mounted so as to be vertically movable in an annular receptacle, a molding half-cavity subjected to the downward stress of a compression spring located between the bottom of the receptacle and its upper face equipped with an outer collar designed to butt against an inner rim of the annular receptacle, thus preventing ejection from this half-cavity under the thrust of the spring. For its part, the lower frame element of each of the molds incorporates an inner ring, in which is engaged vertically slidably in an annular receptacle, the entrance of which corresponds to that of the receptacle of the upper element, a molding half-cavity which is fixed, by means of screws passing through the bottom of the annular receptacle, to a lower piston element which is engaged vertically in an axial blind bore and below the inner ring and which is pushed back by a compression spring located in the bottom of this blind bore, this arrangement comprising the piston element, screws and lower half-cavity being such that, when the mold is closed and an upward pushing action is exerted on the piston element, the screws control the upward sliding in its receptacle of the lower half-cavity which acts in the same way as the upper half-cavity, this descending into its receptacle, at the same time compressing its upper spring, with the result that, during this upward movement of the set of half-cavities, this set acts in the manner of a shear in relation to the edges of the upper and lower receptacles which grip the extrudate burrs between them, these therefore being sheared inside the mold.

BRIEF DESCRIPTION OF THE DRAWINGS

Other characteristics of the present invention will emerge from the following description of an embodiment of an entire machine and mold, given by way of nonlimiting example and illustrated diagrammatically in the accompanying drawings in which.

DETAILED DESCRIPTION OF THE DRAWINGS

Figure 1:
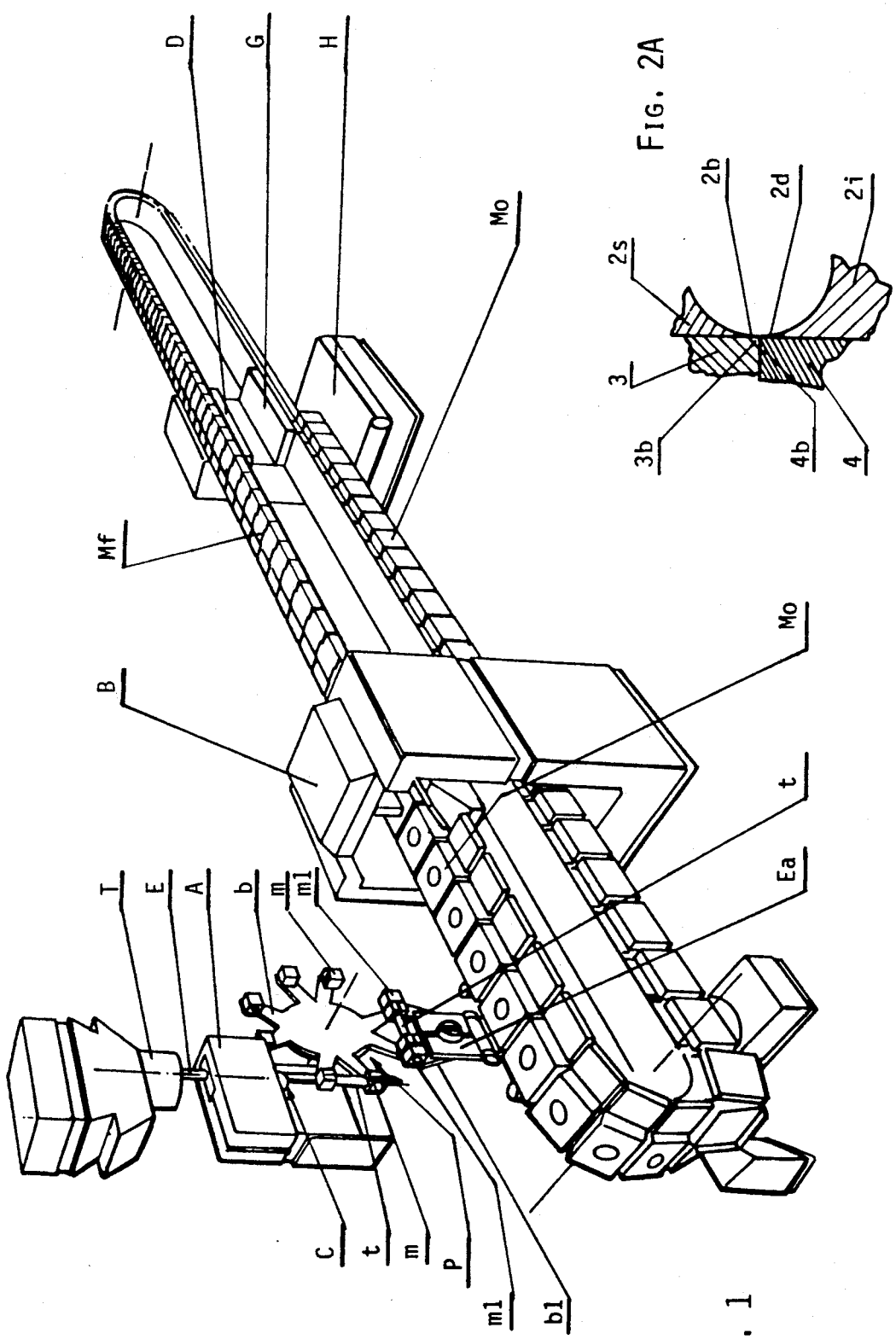
FIG. 1 is a diagrammatic perspective view of an entire automatic machine carrying out the process according to the invention.

As can be noted in FIG. 1, the machine illustrated as a whole comprises, installed one after the other and designed to interact, a plurality of devices which consist of an extrusion device comprising an extrusion head (T) delivering a round extruded extrudate (E) vertically and continuously, a precuring device (A) consisting of a furnace, through which the extrudate passes vertically so that it undergoes a superficial vulcanization, making it graspable, a conical cutting device (C) located at the exit of the furnace and cutting the extrudate into portions, at the same time moving at the same speed as this, a grasping device (P) vertically in line with each extrudate portion (t), operating in stepwise rotation and designed to bring each portion (t) in the horizontal position: a device (Ea) for shaping an annular blank from each portion (t) brought into the horizontal position by the grasping device (P), designed to carry out under hot conditions a concentric joining connection under controlled pressure of the ends of the portion and to tilt each blank flat into the lower molding half-cavity of a mold in the open position (Mo), a series of vulcanization molds connected consecutively to one another by means of a joint to form an endless linear conveyor operating by stepwise movement, a device (B) consisting of a gantry for the compression closing and locking in the closed position of each mold (Mf) containing an annular blank, a push device (D) located at a specific distance from the device (B) for ensuring the vulcanization time and designed to act on a piston element below each mold in order to cause the deburring, within the mold, of the annular gasket or ring produced, a device (G) for controlling the opening of the mold (Mf), arranged to act on each mold when the latter is in the overturned upside-down position in the lower return path of the conveyor, and finally a transverse conveyor belt (H) located underneath and vertically in line with the device (G) in order to remove the gasket or ring produced, which falls by gravity upon the opening of each mold, and the sheared burrs.

The conical cutting device (C) consists of one or more cutting blades (I) arranged at a descending inclination convergent toward the vertical axis of the extrudate (E) and coming closer together, at the same time moving downward at the same speed as the extrudate, in order to cut off portions (t) of the latter, each having one end in the form of a conical tip and the other end in the form of a conical cavity of the same conicity, this device being designed so that the blades retract by quick return to their initial starting point after the cutting operation.

The device (P) for grasping each extrudate portion (t) consists of a star, preferably with eight branches (b), which operates by stepwise rotation as a function of the rate of output of these portions and each branch of which carries at its free end a pair of grasping jaws (m) designed for gripping each superficially vulcanized extrudate portion (t) presented in the vertical position and for relaxing its grip when the stepwise rotation of the star has brought this portion into a horizontal position and the latter is taken up by the grasping jaws (ml) of the device (Ea) for shaping an annular blank.

As noted in FIG. 1, the device (Ea) for shaping an annular blank from each extrudate portion (t) comprises two oscillating arms (b1) associated in the form of a V, the aperture angle of which is adjustable as a function of the length of the portion (t), and each carrying at its free end a pair of jaws (m1) mounted pivotably. These jaws (m1) are designed and controlled to seize the ends of the extrudate portion (t) which project externally from the jaws (m) of the arms (6) of the star supporting this portion when these latter jaws (m) open and move aside as a result of the rotation of the star one step, whereas the jaws (m1) of the two oscillating arms pivot inward on themselves in order to bring the ends of the extrudate portion (t) opposite one another, while the arms (b1) reclose so that this portion assumes the form of a hanging loop until the portion end in the form of a conical tip engages into and is applied under pressure and under hot conditions in the other funnelshaped end of the latter, in order to make a perfectly concentric joining connection.

Figure 2A:
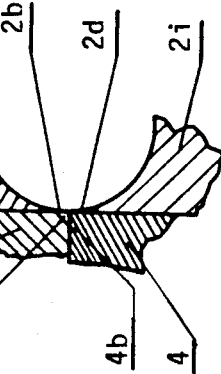
FIG. 2A is a detailed view of the interacting edges, in the closing position, of the two half-cavities and of the upper and lower frame elements of the mold.
Figure 2:
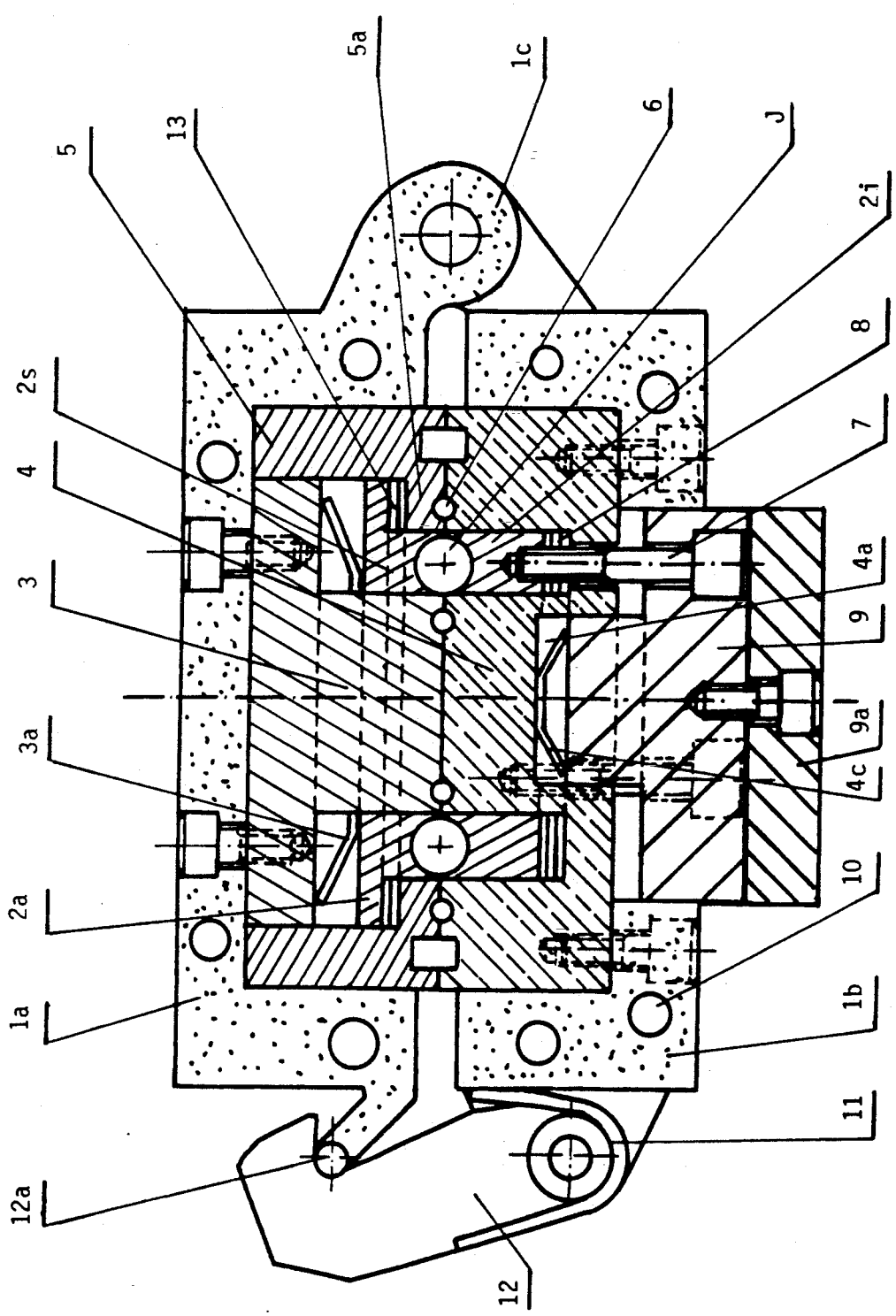
FIG. 2 is a cross-sectional view taken through a mold in the closing position and designed for producing a circular ring, especially an O-ring gasket.

As can be seen in FIG. 2, each mold consists of two frame elements, an upper (1a) and a lower (1b), connected on one side by a hinge (1c) and on the opposite side by a device for locking in the closing position, consisting of a tilting latch (12) supported by the lower element (1b) and stressed in the direction of its release of a projecting part (12a) of the upper element (1a) by a kickover torsion spring (11).

The upper frame element (1a) is pierced transversely with heating-cartridge receptacles (10) and incorporates an axial shouldered block (3) surrounded by a ring (5) equipped with an inner rim (5a), which between them define an annular receptacle in which is engaged vertically slidably an upper molding half-cavity (2s) stressed by a compression spring washer (3a) and having an outer collar (2a) designed to bear on the rim (5a) of the ring (5), so that its cavity edges (2b) are at the same level as the lower edge of the rim (5a) and the edge of the lower face of the axial block (3), as can be seen better in detail in FIG. 2A. It should be noted that, to perfect the mutual leveling of these abovementioned edges, shims (13) arranged between the lower side of the collar (2a) and the upper side of the rim (5a) can be used.

The upper frame element (1b) is likewise pierced transversely with heating-cartridge receptacles (10) and incorporates a ring (4) produced in one piece and equipped with an annular receptacle, in which is engaged vertically slidably a lower molding half-cavity (2i) fastened firmly by means of screws (7) to a lower piston element (9) engaged in a blind bore (4a) below and axial in relation to the ring (4), this piston element being subjected to the stress of a compression spring washer (4c) seated in the bottom of the blind bore and having an attached lower plate (9a) designed to undergo the bearing of a special push member (not shown) incorporated in the device (D) of the mold conveyor. Furthermore, the lower half-cavity (2) is adjusted in position by means of washers (8) placed at the bottom of its receptacle, so that its cavity edges (2d) are at the same level as the upper edges (4b) of its receptacle, as seen better in detail in FIG. 2A.

It should be noted that the upper (1a) and lower (1b) frame elements are provided, located opposite one another and on either side of the half-cavities, with annular grooves (6) designed for receiving the burrs of the gasket blank (J) during the closing of the mold frame elements and vulcanization.

It will easily be understood from the foregoing description that, when the deburring of the vulcanized gasket (J) inside the mold is to be carried out, it is sufficient to push the piston element (9) upward so that, by means of the screws (7), the set of half-cavities is pushed back and slides upward, thereby compressing the spring washer (3a) and thus executing a shearing action in relation to the edges (3b, 4b) gripping between them the blank burrs which are thus sheared before the subsequent opening of the mold.

I claim:

1. A method of making annular devices comprising the steps of extruding continuously material of a cross section of the annular devices, vulcanizing superficially the extruded material, cutting the extruded material into lengths corresponding to the mean circumference of the devices in such manner that one end of each cut is of conical configuration and the other end thereof is of complementary funnel configuration, abutting the opposite ends of each cut length by inserting the conical end into the funnel-shaped end under heated conditions to form a ring-like structure, depositing such ring-like structure into a half cavity yieldably mounted in one part of an open mold, moving a complementary part of said open mold into a closed position so that a half cavity yieldably mounted in said complementary part of said open mold traps said ring like structure in said closed half cavities, said one and complementary mold parts defining one of a series of molds connected together to form an endless conveyor with forward and return paths, moving said molds intermittently on said paths, vulcanizing said ring like structure by heating said mold, imparting a force to a push device movably mounted in one of said parts of said mold and in engagement with at least one of said half cavities so as to produce a shearing action of the burrs of said ring-like structure which are gripped between the complementary edges of said half cavities, tilting the mold into an upside down position on said return path, and finally opening the two parts of said mold so as to extract said ring-like structure in clean and deburred condition.

2. A method according to claim 1 wherein said ring-like structure is extracted by the action of gravity.

3. A method according to claim 1 wherein said ring-like structure is extracted by the application of force to said push device.

4. An automatic machine for forming a deburred ring-like structure, said machine comprising an extrusion head for continuously forming a vertical extrusion of circular cross section, a furnace disposed below said extrusion head and through which said extrusion is passed for performing a superficial vulcanization, a cutting device disposed at the outlet of said furnace for cutting said extrusion into lengths by forming control tips and complementary funnel-shaped cavities on each length, a grasping device for engaging said cut lengths and for manipulating said cut lengths into horizontal positions, a forming device for manipulating said cut lengths into circular configurations and for securing the conical tip of each of said cut lengths into the associated funnel-shaped cavity under hot and controlled pressure conditions to form a ring-like structure a series of interconnected vulcanizing molds movable intermittently under said forming device and having forward and return paths, each of said molds being initially open and including half cavities yieldably mounted in each of said molds for receiving the ring-like structures, a gantry for closing said molds in sequence, a push device movable into each mold in sequence for engaging and moving said half cavities thereby to deburr the associated ring-like structure, and a device for opening the molds in sequence on said return path of molds, so as to accommodate removal of said ring-like structures from said molds.

5. A machine according to claim 4 wherein said cutting device comprises at least one cutting blade which moves vertically downward at the same speed as said extrusion and which converges toward the vertical axis of said extrusion to form a conical tip and a complementary funnel-shaped cavity.

6. A machine according to claim 4 including an intermittently step by step rotatable device having radical arms at the ends of which grasping jaws are mounted for receiving said cut lengths and which release such lengths when such lengths are horizontally disposed.

7. A machine according to claim 6 wherein said cut lengths are received and shaped into ring-like configurations by a pair of oscillating arms having a pair of jaws for engaging the ends of said cut lengths.

8. A machine according to claim 7 wherein said pair of jaws are pivotally mounted and move inwardly toward each other in order to bring the ends of said cut lengths opposite each other and to cause the conical tip to enter the funnel-shaped opposite end while these parts are maintained under pressure and high temperature conditions.

9. A machine according to claim 4 wherein each mold includes an upper frame element having an annular receptacle in which a molding half cavity is disposed, spring means arranged to bias said half cavity downward, and an outer collar formed on said half cavity and engageable with an inner ring of the annular receptacle to prevent ejection of said half cavity due to the thrust of said spring means.

10. A machine according to claim 9 wherein each mold includes a lower frame element having an annular receptacle, an inner ring, and a half cavity fixed by means of screws passing through the annular receptacle to a lower piston element which is engaged in an axial blind bore below the inner ring and biased back by a compression spring disposed in said blind bore.

* * * * *